Jan. 20, 1970  R. D. REIS  3,490,342
PRESSURE CONTROL DEVICE
Filed April 18, 1967  3 Sheets-Sheet 1

Jan. 20, 1970  R. D. REIS  3,490,342
PRESSURE CONTROL DEVICE
Filed April 18, 1967  3 Sheets-Sheet 2

Jan. 20, 1970  R. D. REIS  3,490,342
PRESSURE CONTROL DEVICE
Filed April 18, 1967  3 Sheets-Sheet 3

United States Patent Office 3,490,342
Patented Jan. 20, 1970

3,490,342
PRESSURE CONTROL DEVICE
Robert D. Reis, Hingham, Mass., assignor to United Electric Controls Company, Watertown, Mass., a corporation of Massachusetts
Filed Apr. 18, 1967, Ser. No. 631,715
Int. Cl. F01b *19/00;* F16j *3/00*
U.S. Cl. 92—130         3 Claims

ABSTRACT OF THE DISCLOSURE

A control device in which a diaphragm exposed at one side to pressure is displaceable thereby and a rod at the other side of the diaphragm is movable by such displacement to actuate a switch or valve. An adapter bar is optionally interposable between the rod and switch or valve so that additional switches or valves may be employed to effect multiple control. A loading spring of predetermined length and displacement is employed so that by replacement of one spring of the same length and displacement but of different resistance to displacement the device may be adapted to different pressure ranges.

BACKGROUND OF THE INVENTION

Controls embodying diaphragms responsive to the direct pressure of fluids are not new nor is it new to employ a single control device for effecting actuation of one or more switches or valves. The objects of this invention are to provide a control device of the foregoing kind of improved construction which is responsive to relatively small pressure changes, which embodies relatively few operating parts, which can be readily converted from single to multiple control and which can be easily adapted for different pressure ranges.

SUMMARY

The control device comprises a part embodying an actuating element, actuation of which initiates or terminates an operation, and an actuator supported with one end adjacent thereto. A pressure-responsive member is employed to effect movement of the actuator and a loading spring loads the pressure-responsive member in a direction opposing movement. The loading spring is characterized in that it has a predetermined length and displacement for the maximum pressure of the range for which the device is to be used so that by substitution of one spring for another of the same length and displacement, but of different resistance to the displacement, the device is capable of use for different pressure ranges. The resistance force developed by the spring in opposition to its displacement is equal to the product of the effective area of the pressure-responsive means and the maximum pressure for which the device is intended. The actuator comprises a rigid rod supported with one end in operative engagement with the actuating element and the other end in operative engagement with the pressure-responsive member. A second spring bears upon and loads the pressure-responsive member in a direction opposite the first spring so as to take up slack in the first or loading spring. A guide supports the rod with one end confronting the actuating element and the other end confronting the pressure-responsive means and provides a cage concentric with the rod having closed and open ends, the latter end being adjacent to the pressure-responsive member. The loading spring is mounted in the cage around the rod with one end bearing against the closed end and the other end bearing against the pressure-responsive member. The pressure-responsive member is a flexible diaphragm supported in a chamber containing coaxial openings located at opposite faces of the diaphragm through one of which the rod extends and has engagement with the diaphragm and through the other of which the diaphragm is exposed to the pressure to be controlled. The chamber is so designed that the diaphragm bottoms at one side or the other when the pressure exceeds the maximum pressure of the range. The device is adapted for positive or negative pressures and when used for controlling negative pressures a bushing is threaded into the chamber in concentric relation to the diaphragm at the side exposed to the pressure which is to be controlled. The bushing contains a recess concentric with the opening for receiving a loading spring at that side. The diaphragm is clamped between a pair of rigid circular plates of smaller diameter than the chamber and there is means joining the plates comprising a rivet having a head containing a recess in which the end of the rod is loosely supported. The diaphragm may be buna N rubber or Teflon, or other material depending upon the temperature, pressure and type of the fluid to which it is to be exposed. An adapter in the form of a bar is provided for mounting between the activating element and the actuator element to effect movement of the activating element of the one switch and one or more additional switches.

The invention will now be described in greater detail with reference to the accompanying drawings wherein.

Figures 1, 2:
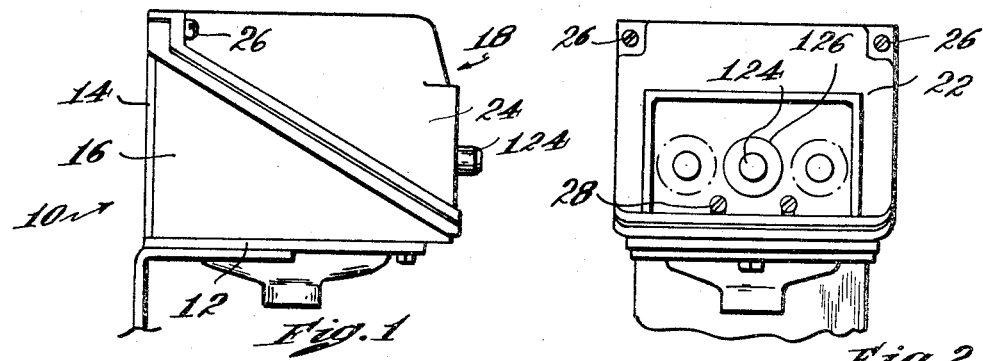
FIG. 1 is a side elevation of the control device.
FIG. 2 is a front elevation as seen from the right side of FIG. 1.

Referring to the drawings, the device has a substantially air-tight and moisture-proof housing of rectangular horizontal section which is divided from back to front in a plane inclined downwardly from the top of the back to the bottom of the front, so that the bottom part 10 has a bottom wall 12 of substantially rectangular configuration, a vertical back wall 14 of substantial rectangular configuration, and spaced parallel side walls 16 of triangular configuration; and a top part 18 having a top wall 20 of substantially rectangular configuration, a front wall 22 of substantially rectangular configuration, and spaced parallel side walls 24 of substantially triangular configuration. The top and bottom parts of the housing are connected to each other at the upper rear corners by bolts 26 and at the lower edge of the front wall by bolts 28, both the bolts 26 and 28 being located at the front of the housing so as to be easily accessible and the openings through which the bolts 28 are inserted being open-sided so as to facilitate lifting the top away from the bottom without having to completely remove the bolts 28. The diagonal division of the top and bottom parts of the housing make the component parts of the instruments interiorly thereof readily accessible for adjustment and repair.

Within the housing (FIGS. 3 and 4) there are a hollow upstanding boss 32 located substantially at the center of the bottom wall, two spaced parallel upstanding legs 34 at the rear side of the boss 32, and three spaced parallel upstanding posts 36, 36a and 36b at the front side of the boss, the boss, legs and posts being integrally formed portions of the bottom wall of the housing. The upper ends of the legs 34 contain semicircular bearing cavities 38 in which are secured the opposite ends of a shaft 40. Screws 42 inserted through the shaft and screwed into the legs 34 rigidly fix the shaft in place. An arm 44 is mounted in a horizontal position for pivotal movement about the axis of the shaft 40 by means of spaced parallel ears 46 integral with the rear end of the arm. The forward end of the arm has an integral boss 48 containing a vertically disposed threaded hole 50 in which there is mounted an adjustable screw 52, the upper end of which has a head containing a kerf 54 by means of which it may be rotated and the lower end of which rests upon the upper end of the center one of the posts 36. The upper end of the post 36 contains an upwardly facing V-shaped notch 54 for reception of the lower end of the screw 52. A coiled spring 56 provided with a loop 58 at one end mounted on a hook 60 at the forward end of the arm 44 and a loop 62 at the other end engaged with a hole 64 at the bottom of the housing yieldably holds the arm 44 in a position controlled by the adjustment of the screw 52.

The part to be actuated either to initiate an operation or to terminate it may be an electric switch or a pneumatic valve. For the purpose of illustration the part shown herein is a switch S provided with terminals t1, t2 and t3 and an activating element or pin p. The switch S is mounted on the arm 44 by means of screw bolts 64 inserted through the holes in the switch element itself, the bolts passing all the way through the switch and being threaded into the arm 44. The switch is mounted so that its activating element or pin p faces downwardly and is vertically above the boss 32.

Actuation of the switch-actuating element or pin p is effected by an actuator element 66 in the form of a rigid rod which is mounted for movement relative to the pin p in the boss 32, the latter for this purpose having at its top an opening 68 corresponding substantially in diameter to the rod which provides a bearing sleeve in which the rod is supported with its upper end adjacent the pin p. The lower end of the rod 66 extends downwardly through the boss 32 into operative engagement with pressure-responsive means 70 comprising a diaphragm supported in a chamber 72 at the lower side of the housing. The chamber is comprised in part of a downwardly facing recess 74 in the lower side of the bottom wall 12, and an upwardly facing recess 76 formed in a part 78 fastened by bolts 80 against the lower side of the wall 12. The recesses 74 and 76 are circular and concentric with relation to each other and to the axis of the rod 66. The diaphragm comprises a flexible element 82, the peripheral edge of which is clamped between the lower side of the bottom wall 12 and the part 78 and has clamped to the portion which is within the chamber 72 rigid circular plates 84 which are of smaller diameter than the recesses, one at each surface of the diaphragm. The plates 84 contain centrally located holes 86 and a rivet 88, provided with a head 90 at its upper end inserted through the holes and through a hole in the diaphragm and upset at its lower end to provide a retaining flange 92, anchors the plates to the diaphragm. The rivet head 90 contains a hole or seat 94 and the lower end of the rod 66 is provided with a portion 96 of reduced diameter which is loosely seated in the hole 94 so that movement of the diaphragm within the chamber is transmitted by the rod 66 to the pin p without cramping or binding.

The part 78 contains centrally of it an opening 98 through which pressure is admitted to the chamber 72 and hence to the underside of the diaphragm and has a hollow nipple 100 concentric with it which is threaded to enable connecting the device to a conductor from the pressure source.

The diaphragm 82 in one form of the invention is a thin, flat, flexible buna N rubber sheet which embodies substantially no spring back when flexed and the recesses 74 and 76 are so designed that it is possible for the plates 84 under extreme pressures to have contact with the bottoms of the recesses without stretching or otherwise deforming, distorting or destroying the diaphragm. Ordinarily, however, the diaphragm does not contact the bottom of either one of the recesses but is supported substantially midway between the bottom by a loading spring 102 disposed about the rod 66, with one end bearing against the inner side of the upper end of the boss 32 and the other end bearing against the upper surface of the upper one of the plates 84 and by a balancing spring 104 situated at the underside of the diaphragm with one end seated in a recess 106 concentric with the opening 98 and the other end bearing upon the underside of the lower one of the plates 84. The spring 104 is designed to just take up the slack in the spring 102 so that any movement of the diaphragm is deflected immediately in compression of the spring.

Figure 13:
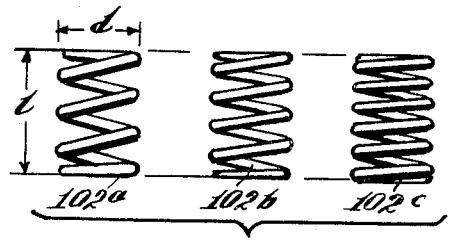
FIG. 13 is an elevation of three loading springs for different pressure ranges which by substitution, one for another, enables using the same device for different pressure ranges.
Figure 9:
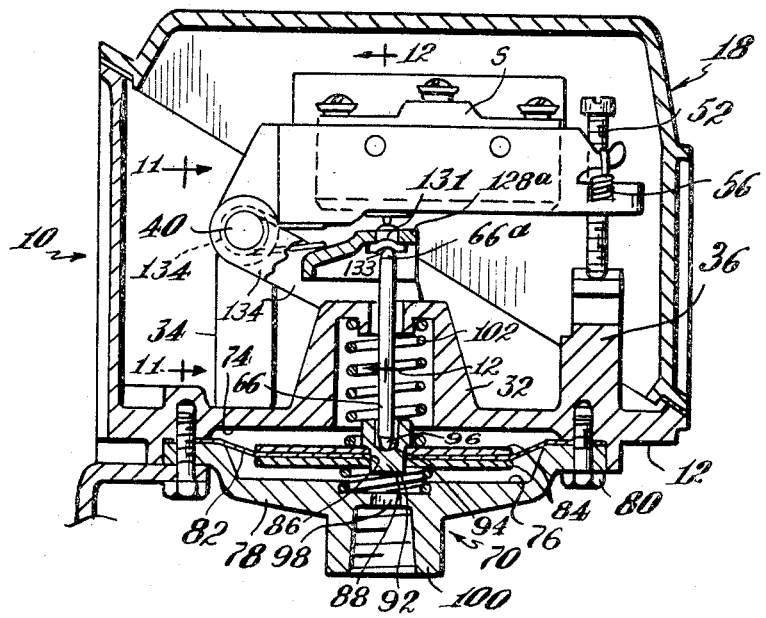
FIG. 9 is a vertical section from front to back of a modified form of the device adapted to effect operation of three switches.
Figure 10:
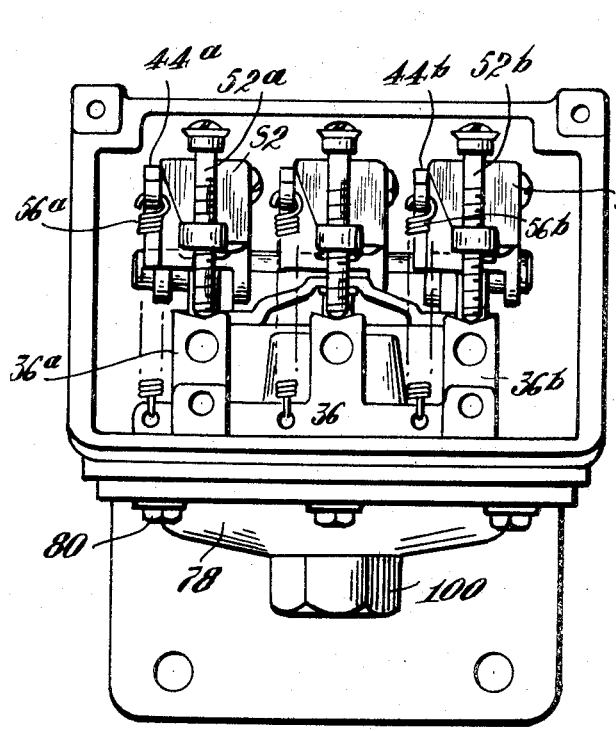
FIG. 10 is a front elevation of the device shown in FIG. 9 with the top part of the housing removed.

The spring 102 is designed to permit movement of the diaphragm and hence the rod 66 through a predetermined distance for a predetermined pressure load applied to the diaphragm thus making the instrument adaptable for use for different pressure ranges by substituting different springs. Three such springs 102a, 102b, and 102c are shown in FIG. 13, all of which are of the same length $l$ and the same diameter $d$. Each spring provides a different pressure for the same displacement which for the instrument herein illustrated is 0.116 inch.

Figure 3:
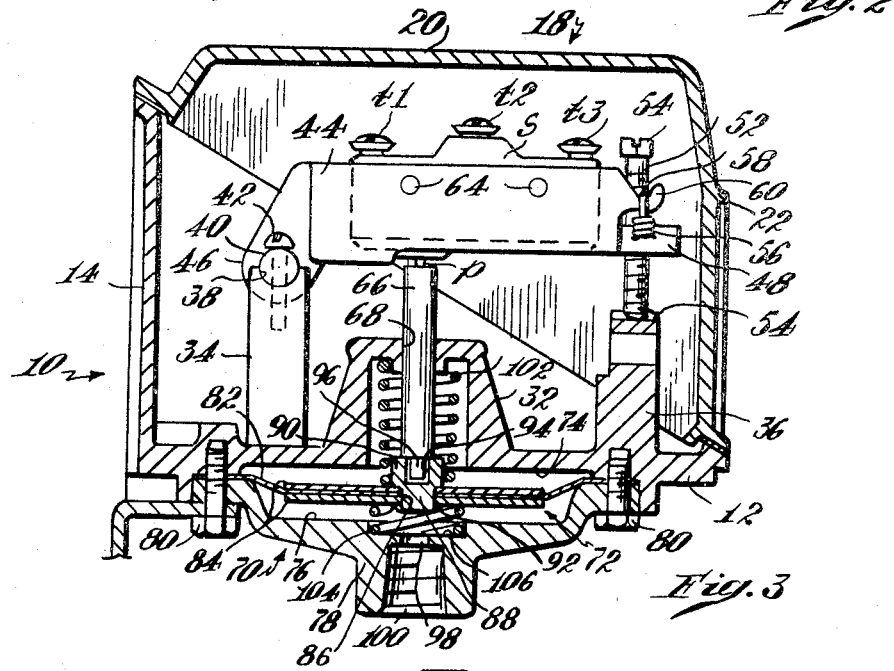
FIG. 3 is a vertical section from front to back showing certain parts internally of the housing in elevation.
Figure 4:
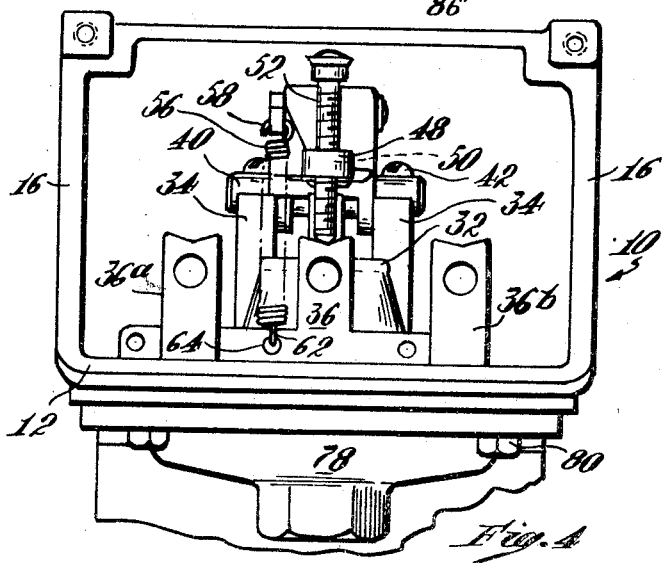
FIG. 4 is a front elevation with the top part of the housing removed.
Figure 6:
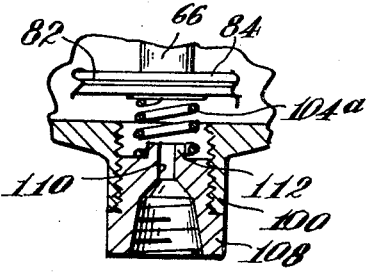
FIG. 6 is a fragmentary section of the lower part of the pressure-responsive means modified for negative pressures.

The control shown in FIG. 3 as just described is for positive pressures, for example, air, water or steam pressure applied directly through the opening 98 to the underside of the diaphragm. By a slight modification of the part 78, as shown in FIG. 6, the device may be used for vacuum control and this is achieved by replacing the spring 104 with a spring 104a of sufficient size to give the desired resistance to displacement of the diaphragm when a vacuum is applied to the lower side of the diaphragm. As shown the nipple 100 in this form is bored out to larger diameter to receive a threaded connector 108 containing a center hole 110 which provides for communication with the lower side of the diaphragm and a boss 112 for supporting the lower end of the spring 104a.

Figure 7:
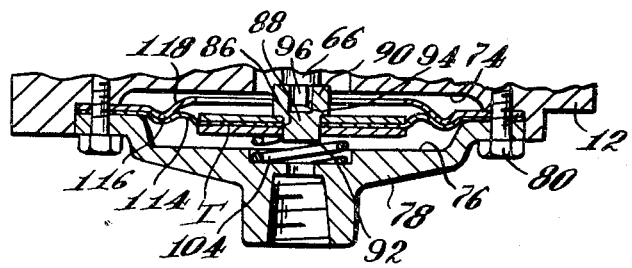
FIG. 7 is a fragmentary section through the pressure-responsive means showing an alternative form of diaphragm.
Figure 11:
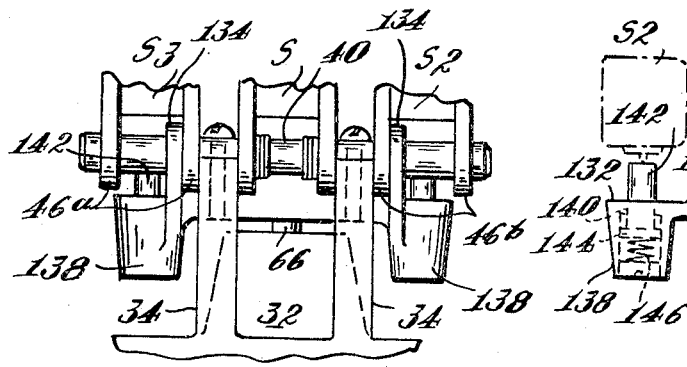
FIG. 11 is an elevation taken on the line 11—11 of FIG. 9.
Figure 12:
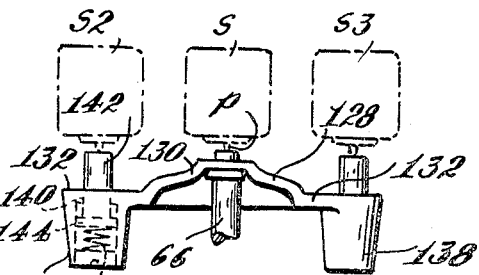
FIG. 12 is an elevation taken on the line 12—12 of FIG. 9 showing the several switches in phantom.
Figure 5:
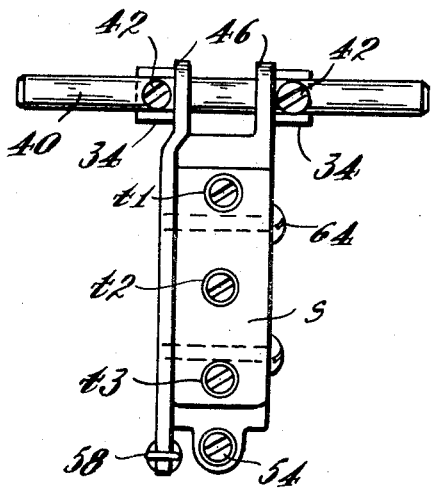
FIG. 5 is a plan view of the switch-supporting arm and shaft on which it is mounted.

For certain purposes a Teflon diaphragm is desired in preference to the buna N rubber diaphragm and such a diaphragm is shown in FIG. 7 marked T. The Teflon diaphragm is similar to the buna N diaphragm in all respects except that it has a preformed annular rib 114 concentric with the plates 84 located between the outer peripheral edges of these plates and the inner peripheral walls of the recesses and is supported by an annular rib 116 formed in a metal plate 118 clamped between the bottom wall 12 and the part 78 together with the diaphragm. The plate 118 prevents permanent displacement of the Teflon diaphragm. The Teflon diaphragm, comprising a glass fabric coated with Teflon, provides for operating at relatively high temperatures and pressures or in corrosive medias which might be destructive to the buna N rubber diaphragm. Buna N rubber affords greater flexibility than the Teflon.

Figure 8:
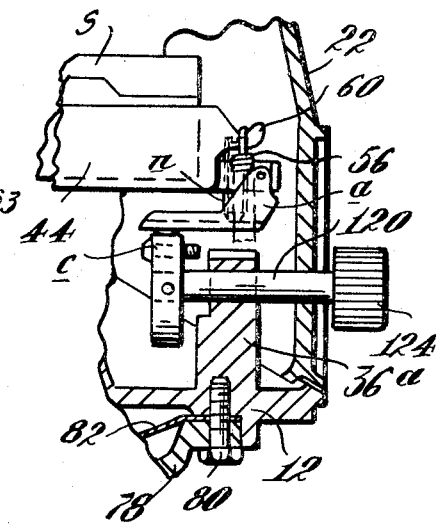
FIG. 8 is a fragmentary vertical section showing a cam in elevation and means for effecting its rotation for adjusting the switch.

As earlier described the switch S is adjusted to an initial position relative to the upper end of the actuator rod 66 by adjustment of the screw 52, the latter being mounted internally of the housing. For greater convenience there may be added to or substituted for the screw 52 a cam C and lever arm a pivotally mounted on the forward end of the arm 44. A screw n threaded through the arm 44 with its lower end bearing on the arm a provides for adjusting the arm relative to the cam. The cam C (FIG. 8) is mounted on a shaft 120 rotatably supported in a bearing hole in the center one of the posts 36a with an end extending through the front wall 22 upon which there is mounted a knob 124. A scale 126 (FIG. 2) is provided on the front wall concentric with the knob 124 marked in pounds per square inch so that it is possible by rotating the knob 124 to adjust the position of the switch for the pressure range of the spring used at any given time.

The instrument as thus far described is illustrated as having a single switch. However the design of the housing is such as to enable mounting additional switches for operation in concurrence with or supplementing the operation of the one switch. Referring to FIG. 9 to 12, there are shown two additional switches S2 and S3. The switch S2 is fastened to an arm 44a and the switch S3 is fastened to an arm 44b. Each of the arms 44a and 44b has at its rear end spaced parallel ears 46a and 46b which are rotatably supported on extensions of the shaft 40. Each of these arms has at its forward end an adjusting screw 52a, 52b respectively, the lower end of which is engaged with one of the posts 36a and 36b at either side of the post 36 and a spring 56a and 56b respectively which holds the screw against its post. So that the single rod 66 is operable to actuate all of the switches when there are more than one an adapter bar or yoke 128 (FIG. 12) is employed and is interposed between the upper end of the rod 66 and the switches. The adapter bar comprises a horizontal centrally located port 130 for engagement with the pin p of the centrally located switch S, transversely extending parts 132 situated below the switches S2 and S3 and at the ends rearwardly extending, spaced parallel arms 134 by means of which the adapter bar is pivotally mounted on the shaft 40. The adapter bar is pivotally movable about the axis of the shaft. The part 130 has set into it a bearing part 131 which provides at the underside a conical recess 133 for reception of the upper end of the rod 66. The rod is provided at its upper end with a cone-shaped end 66a for engagement with this recess so that movement of the rod 66 effects movement of the adapter bar about the axis of the shaft 40. To prevent disengagement of the end of the rod 66 from the bearing a spring 134 is mounted on the shaft 40 with one end fixed thereto and the other end bearing against the adapter bar.

As illustrated, the parts 132 are offset downwardly with respect to the part 130 and each of the parts 132 has at its underside a hollow sleeve 138 at the top of which there is a hole 140 through which projects the stem 142 of a button 144 located in the sleeve and supported at the top by a coiled spring 146. The stem 142 is supported in axial alignment with the pin p of the switch beneath which it is mounted and the spring 146 is designed so that a greater pressure is required to compress it than to actuate the pin p of the switch. The yieldable stems 142 permit overrun so that these switches may be actuated earlier than the switch S without damage. As illustrated in FIG. 1 by the dotted lines, when the device is provided with three switches additional knobs 124 may be employed together with cams adjustable by rotation of the knobs to adjust the additional switches.

The device as thus described is designed especially for direct pressures and direct vacuums, that is, where the pressure-responsive member is exposed to the pressure medium such as air, water or steam and the like which may be corrosive and at relatively high temperatures is especially sensitive to very small pressure changes, for example, in the order of 0.10 p.s.i. change in pressure; enables multiple control or back up control for safety purposes; and may be adapted for many pressure ranges by the simple expedient of substituting one pressure loading spring for another without modification of the device in any other respect.

I claim:

1. A control device comprising a part embodying an actuating element, actuation of which initiates or terminates an operation, an actuator supported with an end adjacent the actuating element for effecting activation thereof, a pressure-responsive member for effecting movement of the actuator and a spring loading said pressure-responsive member in a direction opposing movement thereof, said part comprising an arm, means pivotally supporting one end of the arm in a position extending across the adjacent end of the actuator so as to hold the actuating element in confronting relation to said adjacent end of the actuator, spring means at the distal end of the arm yieldably urging the arm and actuator element toward said actuator, and adjustable means at the distal end of the arm for adjusting the initial position of the arm and actuator element relative to the actuator comprising a cam supported adjacent the distal end of the arm a lever pivotally mounted on the arm at said distal end between the arm and the cam with its distal end bearing against the cam, and a screw threaded on the arm with an end bearing against the lever operable, by rotation, to move the distal end of the lever relative to the distal end of the arm.

2. A control device comprising a plurality of arms, a switch mounted on each arm, each switch embodying an actuating element, actuation of which initiates or terminates an operation, means pivotally supporting the several arms for movement about a predetermined axis, said switches being mounted on said arms intermediate their pivoted and distal ends, a single actuator supported with an end adjacent the actuating element of one of said switches, an actuator bar supported between said end of the actuator and the actuating element of said one switch, said actuator bar having laterally offset portions opposite the actuating elements of the remaining switches, a button fixed to the actuator bar opposite the actuating element of said one switch for non-yielding engagement therewith when the actuator bar is moved toward said one switch, buttons carried by the laterally offset portions of the actuator bar opposite the actuating elements of the remaining switches, means yieldably supporting said latter buttons, pressure-responsive means for effecting movement of the actuator and hence the actuator bar relative to said switches and their actuating elements, a spring loading said pressure-responsive member in a direction opposing said movement, and adjustable means at the distal end of each of the arms for adjusting the initial position of the actuating element of each switch relative to the actuator bar.

3. A control device according to claim 2, wherein said actuator bar is pivotally supported for movement about said predetermined axis in response to movement of the actuator relative to the actuating elements of the switches, and there is spring means operating on the actuator bar in a direction to hold it yieldingly engaged with the actuator.

References Cited

UNITED STATES PATENTS

| | | | |
|---|---|---|---|
| 508,133 | 11/1893 | Gold | 92—100 X |
| 2,103,214 | 12/1937 | Coffin | 92—102 X |
| 2,121,079 | 6/1938 | Eskin | 200—83 X |
| 2,289,882 | 7/1942 | Myers | 200—81.4 X |
| 2,306,768 | 12/1942 | Wile | 92—94 |
| 2,471,387 | 5/1949 | Cooper | 92—100 X |
| 2,766,349 | 10/1956 | Hamburg | 200—81.4 X |
| 2,808,484 | 10/1957 | Beck et al. | |
| 2,895,024 | 7/1959 | Brown et al. | 92—101 X |
| 2,905,199 | 9/1959 | Cook | 92—100 X |
| 3,028,878 | 4/1962 | Natho | 92—5 X |
| 3,136,130 | 6/1964 | McGay | 92—131 X |
| 3,192,836 | 7/1965 | Schwartzwalder | 92—94 X |
| 3,235,683 | 2/1966 | Beeman | 200—83 X |
| 3,326,089 | 6/1967 | Machado | 92—5 |
| 3,376,794 | 4/1968 | Griffith et al. | 92—101 X |

FOREIGN PATENTS 611,950  11/1948  Great Britain.

MARTIN P. SCHWADRON, Primary Examiner

I. C. COHEN, Assistant Examiner

U.S. Cl. X.R.

92—59, 100, 131, 140; 200—81.4, 83